(12) United States Patent
Laksono

(10) Patent No.: US 7,602,847 B1
(45) Date of Patent: Oct. 13, 2009

(54) DEVICE AND METHOD FOR COMPRESSION OF A VIDEO STREAM

(75) Inventor: Indra Laksono, Richmond Hill (CA)

(73) Assignee: Vixs Systems, Inc., Toronto, Ontario (CA)

( * ) Notice: Subject to any disclaimer, the term of this patent is extended or adjusted under 35 U.S.C. 154(b) by 1845 days.

(21) Appl. No.: 09/819,147

(22) Filed: Mar. 27, 2001

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................................. 375/240.16

(58) Field of Classification Search ............ 348/14.09, 348/699; 375/240.12, 240.16, 240.24, 240.25; *H04N 7/12*
See application file for complete search history.

(56) References Cited

U.S. PATENT DOCUMENTS

| | | | |
|---|---|---|---|
| 4,866,395 A | 9/1989 | Hostetter | |
| 5,027,203 A * | 6/1991 | Samad et al. | 348/699 |
| 5,093,847 A | 3/1992 | Cheng | |
| 5,115,812 A | 5/1992 | Sano et al. | |
| 5,253,056 A | 10/1993 | Puri | |
| 5,347,309 A * | 9/1994 | Takahashi | 375/240.12 |
| 5,475,434 A * | 12/1995 | Kim | 375/240.24 |
| 5,563,950 A | 10/1996 | Easter et al. | |
| 5,600,646 A * | 2/1997 | Polomski | 370/263 |
| 5,602,589 A | 2/1997 | Vishwanath et al. | |
| 5,635,985 A * | 6/1997 | Boyce et al. | 375/240.15 |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A * | 8/1999 | Nilsson et al. | 375/240.12 |
| 5,996,029 A | 11/1999 | Sugiyama et al. | |
| 6,005,623 A * | 12/1999 | Takahashi et al. | 375/240.16 |
| 6,005,624 A * | 12/1999 | Vainsencher | 375/240.14 |
| 6,014,694 A | 1/2000 | Aharoni et al. | |
| 6,040,863 A * | 3/2000 | Kato | 375/240.24 |
| 6,081,295 A | 6/2000 | Adolph et al. | |
| 6,141,693 A | 10/2000 | Perlman et al. | |
| 6,144,402 A | 11/2000 | Norsworthy et al. | |
| 6,167,084 A | 12/2000 | Wang et al. | |

(Continued)

FOREIGN PATENT DOCUMENTS

EP     0661826  A2     7/1995

(Continued)

OTHER PUBLICATIONS

Bo Shen et al, Adaptive Motion-Vector Resampling for Compressed Video Downscaling, Sep. 1999, IEEE Transactions on circuits and system for video technology, vol. 9, No. 6, pp. 929-936.*

(Continued)

*Primary Examiner*—Nhon T Diep

(57) ABSTRACT

A video processing device and method for a video system is provided. The device creates downscaled compressed video stream data from an original compressed video stream. The device accomplishes this and achieves a large saving in processor and memory bandwidth by reusing motion vectors derived during the decompression process.

19 Claims, 2 Drawing Sheets

U.S. PATENT DOCUMENTS

| | | | |
|---|---|---|---|
| 6,178,265 B1* | 1/2001 | Haghighi | 382/236 |
| 6,182,203 B1 | 1/2001 | Simar, Jr. et al. | |
| 6,215,821 B1 | 4/2001 | Chen | |
| 6,219,358 B1 | 4/2001 | Pinder et al. | |
| 6,222,886 B1 | 4/2001 | Yogeshwar | |
| 6,236,683 B1* | 5/2001 | Mougeat et al. | 375/240.16 |
| 6,259,741 B1 | 7/2001 | Chen et al. | |
| 6,263,022 B1 | 7/2001 | Chen et al. | |
| 6,300,973 B1* | 10/2001 | Feder et al. | 348/14.09 |
| 6,307,939 B1 | 10/2001 | Vigarie | |
| 6,314,138 B1 | 11/2001 | Lemaguet | |
| 6,323,904 B1 | 11/2001 | Knee | |
| 6,366,614 B1 | 4/2002 | Pian et al. | |
| 6,385,248 B1* | 5/2002 | Pearlstein et al. | 375/240.25 |
| 6,393,059 B1* | 5/2002 | Sugiyama | 375/240.02 |
| 6,438,168 B2 | 8/2002 | Arye | |
| 6,480,541 B1 | 11/2002 | Girod et al. | |
| 6,526,099 B1 | 2/2003 | Chistopoulos et al. | |
| 6,549,561 B2 | 4/2003 | Crawford | |
| 6,584,509 B2 | 6/2003 | Putzolu | |
| 6,714,202 B2 | 3/2004 | Dorrell | |
| 6,724,726 B1 | 4/2004 | Coudreuse | |
| 6,748,020 B1 | 6/2004 | Eifrig et al. | |
| 6,996,177 B1* | 2/2006 | Beuker | 375/240.16 |
| 2001/0026591 A1 | 10/2001 | Keren et al. | |
| 2002/0106022 A1 | 8/2002 | Takahashi et al. | |
| 2002/0110193 A1 | 8/2002 | Yoo et al. | |
| 2002/0138259 A1 | 9/2002 | Kawahara | |
| 2002/0145931 A1 | 10/2002 | Pitts | |
| 2002/0196851 A1 | 12/2002 | Lecoutre | |
| 2003/0093661 A1 | 5/2003 | Loh et al. | |
| 2003/0152148 A1 | 8/2003 | Laksono | |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Pedro Assuncao and Mohammad Ghanbari, "Rate Reduction Techniques for MPEG-2 Video Bit Streams," SPIE vol. 2952, Apr. 1996, 10 pp.

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computational Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date unknown).

Luis Ducla Soares et al., "Influence of Encoder Parameters on the Decoded Video Quality for MPEG-4 Over W-CDMA Mobile Networks," NTT DoCoMo, Inc. technical paper, 4 pp. (date unknown).

Thomas Wiegand et al., "Long-Term Memory Motion-Compensated Prediction for Rubust Video Transmittion," in Proc. ICIP2000, 4 pp.

P. Greg Sherwood et al., "Efficient Image and Channel Coding for Wireless Packet Networks," Univ. of CA, San Diego, CA, 4 pp. (date unknown).

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Real-Time Transcoding of Mpeg-2 Video Bit Streams, Sep. 12, 1997.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG20030061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2. No. 2. Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History, " Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan. Ranga S. et al., "Adaptive Streaming of MPEG Video Over IP Networks," 22nd IEEE Conference on Local Computer Networks (LNC '97), Nov. 2-5, 1997 IEEE, pp. 398-409, Architecture Technology Corporation, Minneapolis, MN.

Rejaie, Reza et al., "Architectural Considerations for Playback of Quality Adaptive Video Over the Internet," XP002177090. 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras. Greece.

Chalidabhongse, Junavit et al., "Fast Motion Vector Estimation Using Multiresolution-Spatio-Temporal Correlations," IEEE Transcations On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging Academic Press Ltd., vol. 56. No. 5, Oct. 2000. pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000. pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, California.

Liu, Julia J., "ECE497KJ Course Project: Applications of Wiener Filtering In Image and Video De-Noising," pp. 1-15, May, 21, 1997.

Jostschulte, K. et al., "A Subband Based Spatio-Temporal Noise Reduction Technique for Interlaced Video Signals," University Dortmund, Dortmund. Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996. 1997 International Conference on Image Processing, Vancouver, Canada.

Tourapis. Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encoder and Decoder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct 4, 1997, pp. 86-100, XP000722036.

"Sharp Product Information: VTST-Series NTSC/PAL Electronic Television Tuners," RF Components Group. Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBand Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communications, Singapore.

Razavi, Behzad, "Challenges in Portable RF Transceiver Design," Sep. 1996, 1996 IEEE, pp. 12-25. Circuits & Devices.

Mannion, Patrick, "IceFyre Device Cools 802.11a Power Consumption," Sep. 24, 2001, Planet Analog. National Semiconductor, <<http://www.planetanalog.com/story/OEG20010924S0079>>, access on Nov. 5, 2001.

"Ice Fyre Semiconductor: IceFyre 5-GHz OFDM Modem Solution," Sep. 2001, pp. 1-6, IceFyre: Rethink Wireless, IceFyre Semiconductor, Inc.

Pozar, David M., "Theory and Design of Ferrimagnetic Components," 1990. pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999. LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

DEVICE AND METHOD FOR COMPRESSION OF A VIDEO STREAM

FIELD OF THE DISCLOSURE

This invention relates generally to processing video streams, and more particularly to recompression of downscaled decompressed video streams.

BACKGROUND

Continuous video stream playback systems using MPEG and variants are well known in the art. With improvements in memory subsystems and digital content delivery methods, higher continuous video images, such as those using the HDTV/ATSC 1920x1800i format will become more common.

A continuous moving video image stream in its raw form requires very high transmission rates. One way of limiting by the high transmission rates is currently solved by using compression schemes, such as MPEG encoding schemes, that take advantage of continuity in inter-frame content to create very highly packed data. MPEG and similar variants use motion estimation of blocks of image data between frames to perform this compression.

The step to compress video data is processor and memory bandwidth intensive. Motion estimation, a compression step, requires a large amount of the computational work that can use up a significant amount of available bandwidth. In Motion Estimation, a frame of image data is first subdivided into a plurality of fragments or blocks. Next, a fragment or group of blocks of the current frame image is compared against one or more fragments or group of blocks in another frame or frames. The optimal fragment or group of blocks in each of the alternate frames may not be in the same location as the current frame. This location is often different between each of the alternate frame or frames and the current frame. The location of each of these fragments is represented as a motion vector of the form (+/-Dx, +/-Dy).

In the case of MPEG, each of Dx and Dy is a multiple of 0.5. A motion vector that has a 0.5 component means that the fragment from an alternate frame is formed by averaging two side by side pixels from either the same horizontal row or vertical column or four pixels in a 2×2 block. A complex processor and memory bandwidth intensive search algorithm that has to consider a plurality of fragments combinations is generally used to construct each motion vector.

With extremely high resolutions, such as the 1920x1080i format, the data rate of such a compressed stream will be very high. This high data rate poses at least three sets of problems. First, to record or save such a stream over any length of time requires large amounts of storage that can be prohibitively expensive. Second, many display devices that can be used to view such a stream may not be capable of displaying such a high resolution data stream. Third, where there is a data network with multiple viewing or receiving devices, such a network will typically have a fixed bandwidth or capacity. Such a network may be physically incapable of simultaneously supporting multiple viewing devices.

Note, that in general, there can be a plurality of motion vectors required to build each fragment or macroblock of a frame. This further adds to the processing and bandwidth problem. Accordingly, there is a need for an improved device and method for processing video streams.

DETAILED DESCRIPTION OF THE FIGURES

Figure 1:
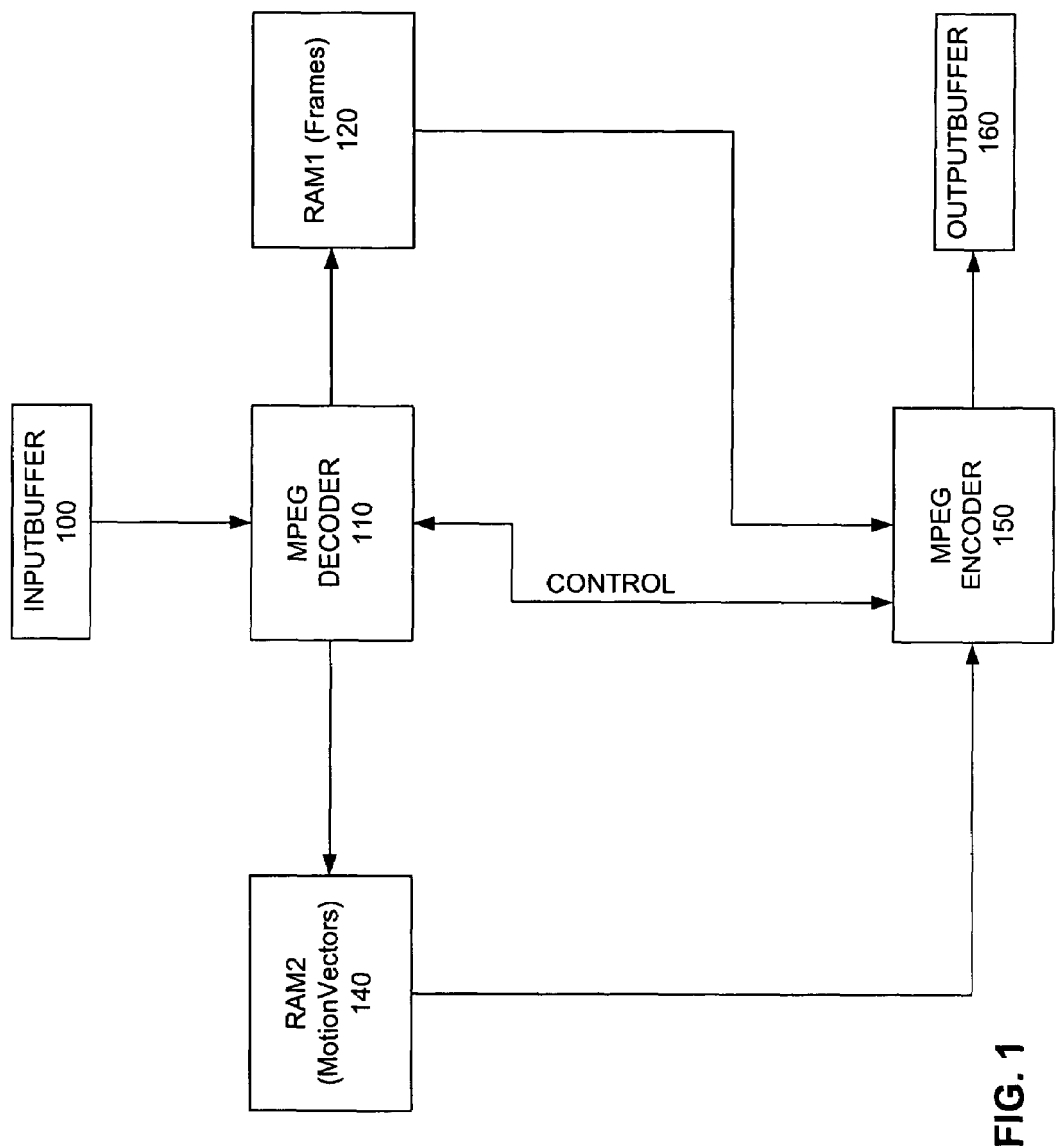
FIG. 1 is a functional block schematic diagram of an MPEG transcoder processor in accordance with one embodiment of the present invention.

Referring to FIG. 1, a high level functional block diagram of a video processing device is shown. The video processing device has an input buffer 100 that receives data representing a video image to be provided to a general MPEG decoder 110. The MPEG decoder 110 creates either the video image or an optionally scaled down representation of the video image decompressed frames in a memory, RAM1 120, and also obtains the motion vectors from the decompression process. The motion vectors are saved in memory, RAM2 140. Note, the motion vectors are not normally saved in memory using a standard MPEG decoder. Also note that in other embodiments, the memories 120 and 140 can include dynamic random access memory, static dynamic random access memories, hard drive storage devices, and the like.

The MPEG encoder 150 performs many of the steps of normal MPEG encoding, but avoids the computationally intensive motion estimation step by retrieving the motion vectors previously saved in memory, RAM2 140. By retrieving the set of surrounding motion vectors and building a new set of motion vectors, the encoder 150 avoids the expensive search that is required in conventional motion estimation. The output buffer 160 is a bit bucket that accumulates data bits before it out to a final destination, such as memory or any output ports to a device coupled to receive such data.

Figure 2:
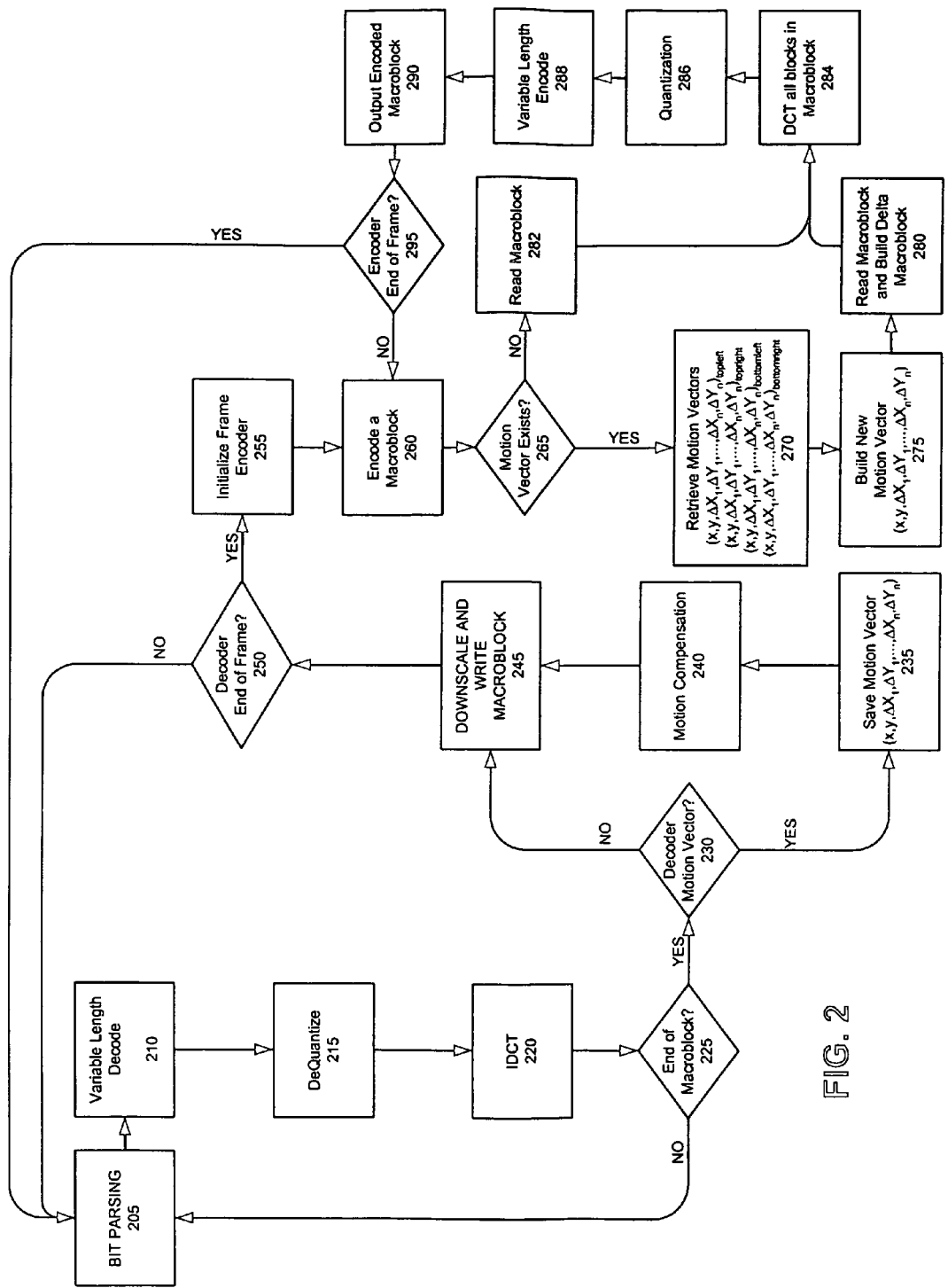
FIG. 2 is a detailed flowchart illustrating operation of the MPEG transcoder processor of FIG.

With reference to the specific embodiment of FIG. 2, elements with labels from 310-395 indicate functions the decoder portion, and elements 410-495 identify functions encoder portion of the transcoder. Note, that this example assumes an image downscale of ½×½. A macroblock, in MPEG terminology, is a 16×16 matrix of individual picture elements. A block in MPEG terminology is an 8×8 matrix of individual picture elements. When downscaling by ½×½, it is assumed that a 2×2 set macroblocks are converted to form a single macroblock. The ½×½ downscaling operation is typically performed with an effort to preserve as much content of the original image as possible, while presenting the final result in a smaller bitmap. Downscaling is well understood to mean a process where a group of picture elements are combined in some fashion to create another group consisting of less picture elements. For downscaling of ½×½ several options are available. For example, one possible implementation, the picture elements are blended in a predefined method. However, one reasonably versed in the art will understand that there are multiple ways to blend them to achieve the same results or perhaps to even scale without blending.

Referring again to FIG. 2, the bit parsing step 310 retrieves a current macroblock being decoded. Variable length decode 320, for example using DeHuffman, is performed, and can be run level or run length decoding, to retrieve information about a particular block. The information retrieved contains a series of run-level sequences, each representing an 8×8 spare matrix (known as a block) with a run of sequential zero values implicitly defined by the run. When referred to as run-level within the MPEG scope, the run refers not to repeated runs of the value in level, but to consecutive runs of 0. In the case of MPEG, the block is built in a zigzag fashion.

After the decode, the process dequantizes the generated block at 330, which involves multiplying each element in the block with an element in a matrix. As is well known in the art, dequantization is inverse quantization, where a matrix of fixed constants might be retrieved or determined at the start of the decoding process, rarely changing as the stream is decoded. Each element of the sparse matrix is multiplied with this constant value from the corresponding entry in this matrix of constants. To understand the significance of the inverse quantization process, it should be understood first that during the compression process, the blocks went through a discrete cosine transform (DCT) step to convert the picture blocks into the frequency domain. In this representation of the picture blocks, the original blocks can still be retrieved (up to arithmetic rounding resulting from limitations in number representation) without any loss.

In the frequency domain, the block of data has an interesting property. The main determinants of the appearance of the image to the human eye is primarily decided by the terms of the block (matrix) that are in the top left corner (starting at indices [0,0,] of the matrix). Changes to the terms to the bottom right of the block tend to have less of a visible effect on the reconstructed blocks to the human eye. The purpose of quantization during the encoding process is to take advantage of this property and attempt to treat terms that are close to zero and positioned closer to the bottom right, as zero, while preserving as much of the information in the top left corner as possible.

After the block has been dequantized, we proceed to the inverse Discrete Cosine Transform, (iDCT), step 340, that obtains the block in its raw form. The steps 310-340 proceed via a loop through the end of macroblock decision step 350, until a complete macroblock is obtained. For MPEG, this macroblock typically consists of 4 (2×2) blocks of information in the Y (luma, or brightness) and 1 block of Cr and 1 block of Cb. When the complete macroblock is obtained, the process proceeds to test decoder motion vector step, at 360. When there is no motion vector for a particular macroblock, the macroblock will be downscaled for example by either 1, 2, 4 or 8 and written out during the downscale and write macroblock step, at 390.

Where there is a set of motion vectors, the motion vectors will be saved, at step 370, into a storage area, such as memory 140 of FIG. 1, that holds all the original motion vectors used to build this frame. Motion compensation, at step 380, is performed to build a new macroblock. This new macroblock is then downscaled by either 1, 2, 4 or 8 and provided to in the downscale and write macroblock step, at 390.

When the process reaches the decoder end of frame step, at 395, if the frame has finished, the process initializes the frame encoder, at 410, which will start to encode a macroblock, at 420. If the current macroblock has no motion vectors (determined at step 430), then the macroblock is read, at step 470, from the downscaled and decompressed frame created during the decoding process, and each block in the macroblock undergoes a discrete cosine transform, at step 480. If the current macroblock has motion vectors (determined at decision step 430), the four sets of neighboring motion vectors are retrieved from storage, at 440, and are used to build the original image frame, at steps 450 and 460. In this example, note that scaling of ½×½, is used. Retrieval of more motion vectors for other scale factors would be required. For example, if scaling by ⅓×⅓, 9 motion vectors would be used. If scaling is by ⅔×⅔, between 4 to 9 motion vectors would be used, depending on how the resultant motion vector is generated. In a specific embodiment, a control input of the system is used to set integer values of s and t, where t is an integer greater than zero, and s is an integer greater than one but less than t. The resulting image represented by the downscaled and decompressed video stream is s/t of the size of the image represented by the compressed video image stream.

The new motion vector, at 450, can be built in multiple ways. In one method, one may choose to use a simple averaging modulo ½ of each component of the vectors from each of the four sets of motion vectors. In an alternate embodiment, one may choose the most frequently occurring motion vector ($\Delta X_k$, $\Delta Y_k$) from each set of kth-motion vectors, with an arbitrary method for breaking ties. One possible method of breaking ties is to choose the element that is closest to the top left motion vector. In another embodiment the tie breaking function uses a random method to select among the candidate motion vectors. In yet another embodiment, the tie breaking function uses a predetermined pattern of choices to select among candidate motion vectors.

With the new motion vector built at step 450, the process proceeds to read the macroblock from the stored decompressed image frame and then builds a delta frame containing the result of applying a reverse motion compensation step, to obtain the delta macroblock, at 460. At this point, the delta macroblock is sent to the unit that performs DCT on all the blocks of the macroblock, at 480. The resulting transformed block undergoes quantization, at 485 (rounding integer division of each element by elements of a matrix). The resulting quantized matrix representation of each block is then variable length encoded, at 488, and the compressed result is sent to the output encoded macroblock unit, at 490. This process continues until detecting the encoder end of frame, at 495, signaling the decoder to begin working on the next frame.

Note, with respect to FIG. 2, that with use of double buffering of the motion vectors, and queuing other command streams, both the encoder and decoder steps may both run in parallel.

One feature of the disclosed embodiment is that, where there are motion vectors, the motion vectors will be saved, at 370, into a storage area that holds all the original motion vectors used to build the processed frame. In addition, the compute intensive and costly motion estimation step is avoided by retrieving the stored motion vectors and building a new motion vector set using simple process steps, at 450. By avoiding the expensive motion estimation step, the disclosed embodiment may provide a much more cost-effective solution that achieves largely the same quality of transcoding as systems that searches the motion vectors from scratch.

The particular embodiments disclosed herein are susceptible to various modifications and alternative forms. Specific embodiments therefore have been shown by way of example in the drawings and detailed description. It should be understood, however, that the drawings and detailed description are not intended to limit the invention to the particular form disclosed, but on the contrary, to the maximum extent permitted by law, the invention is to cover all modifications, equivalents and alternatives falling within the spirit and scope of the present invention as defined by the following claims, and their equivalents. For example, in the system illustrated in FIG. 2, the connections between the decoder 110 and the memories 120 and 140 may represent separate busses or common busses. Likewise, the connection between the encoder 150 and the output buffer and the connection between the decoder and the input buffer may represent the same or different connections, and may even be common with the connections to the memories 120 and 140. Also, in another embodiment of the present invention, one of a normal mode of operation, where the encoder determines the motion vectors, and a motion vector reuse mode as described herein is selected. Selection of one mode will generally be based on the availability of previously saved motion vectors. Note that in another embodiment, during a normal mode of operation, the decoder would not save motion vectors.

What is claimed is:

1. A system comprising:
 a video decoder to receive a video input stream having a plurality of first motion vectors, the video decoder to provide decoded video and the plurality of first motion vectors associated with the video input stream;
 a first memory coupled to the video decoder to store the plurality of first motion vectors;
 a scaler coupled to receive the decoded video and to provide a scaled video; and
 an encoder coupled to the scaler and the first memory to provide a compressed representation of the scaled video using the first motion vectors saved in the first memory, the encoder having a vector generation portion that provides second motion vectors based on the plurality of first motion vectors saved in the first memory, the second motion vectors including a specific motion vector based on a most frequently occurring motion vector selected from the plurality of first motion vectors by a tie breaking function using a random method or a predetermined selection pattern.

2. The system of claim 1 further comprising:
 a second memory coupled to the video decoder to store a representation of the decoded video.

3. The system of claim 2, wherein the representation of the decoded video is the decoded video.

4. The system of claim 2, wherein the scaler is a downscaler.

5. The system of claim 1, wherein the video input is an MPEG data input stream.

6. The system of claim 1, wherein the first memory comprises a hard drive.

7. The system of claim 1, wherein the first memory coupled to the video decoder is to store all motion vectors used to build a frame of the video input stream.

8. The system of claim 1, wherein the system further comprises a scaling input to indicate an amount of scaling to be implemented by the scaler.

9. The system of claim 1, wherein:
 the video decoder is to receive the video input stream having a first set of motion vectors representing a first frame of video, the plurality of first motion vectors being at least a portion of the first set of motion vectors; and a second set of motion vectors representing a second frame of video; and
 the first memory coupled to the video decoder is to simultaneously store the first set of motion vectors and the second set of motion vectors.

10. The system of claim 1, wherein the decoder and encoder are part of a transcoder processor.

11. A method comprising:
 determining, at a decoder, a plurality of first motion vectors associated with a compressed first video image;
 storing the plurality of first motion vectors;
 generating one or more second motion vectors including a specific motion vector based on a most frequent occurring motion vector selected from the plurality of first motion vectors by a tie breaking function using a random method or predetermined selection; and,
 at an encoder, generating a compressed second video image based upon the one or more second motion vectors, wherein the compressed second video image is a scaled representation of the first video image.

12. The method of claim 11 further comprising:
 storing a representation of the first video image after determining; and
 wherein generating a compressed second video image includes generating the compressed second video image based on the one or more second motion vectors and a third video image, wherein the second video image is a representation of the first video image.

13. The method of claim 12, wherein the representation is a scaled-down representation.

14. The method of claim 11, wherein a number of motion vectors in the one or more second motion vectors that represents the second video image is different than a number of vectors in the plurality of first motion vectors that represent the first video image, and wherein the second video image is a representation of the first video image.

15. The method of claim 14, wherein the number of motion vectors in the one or more second motion vectors is less than the number of vectors in the plurality of first motion vectors.

16. The method of claim 11, wherein the storing the plurality of first motion vectors includes storing the first motion vectors on a hard drive.

17. The method of claim 11, wherein the plurality of first motion vectors include all motion vectors used to build a frame of the compressed first video image.

18. The method of claim 11, further comprising receiving a scaling indicator to indicate an amount of scaling to be applied to the compressed second video image.

19. The method of claim 11, wherein storing the plurality of first motion vectors further indicating the plurality of first motion vectors in response to a mode indicator being in a first state.

* * * * *